July 30, 1946.  C. CROWLEY  2,405,018
AUTOMATIC GRIPPER
Filed Feb. 17, 1945  2 Sheets-Sheet 1

INVENTOR.
Charles Crowley
BY
Harry Jacobson
ATTORNEY

July 30, 1946.  C. CROWLEY  2,405,018
AUTOMATIC GRIPPER
Filed Feb. 17, 1945  2 Sheets—Sheet 2

INVENTOR.
Charles Crowley
BY
ATTORNEY

Patented July 30, 1946

2,405,018

UNITED STATES PATENT OFFICE 2,405,018

AUTOMATIC GRIPPER

Charles Crowley, Astoria, N. Y., assignor to Victor Metal Products Corporation, Brooklyn, N. Y., a corporation of New York Application February 17, 1945, Serial No. 578,438

7 Claims. (Cl. 294—106)

This invention relates to mechanism for transferring from one machine or conveyor to another fragile thin-walled tubes such as collapsible tubes of metal or the like. The present invention is an improvement over the mechanism disclosed for that purpose in Patent No. 1,839,438 to Walter Prussing for Method and mechanism for making collapsible tubes, and relates particularly to the means for gripping the tube preparatory to the removal thereof from one mechanism and the transfer thereof to another.

In said Patent No. 1,839,438 to which reference is hereby made and which is incorporated herein by such reference, is shown among other things, a gripping device comprising a pair of spring-pulled fingers to engage a cap on the end of a tube or the threaded neck of the tube. The fingers are provided with cam-like parts engaged by a reciprocating rod to spread the fingers apart. When the fingers are positioned around the part to be gripped, the rod is withdrawn from between the fingers, permitting the spring to close the fingers on the work. Suitable transfer mechanism carries one or two sets of grippers and is operated in such a manner that after the work is gripped by the fingers, said fingers and the work gripped thereby are withdrawn from the mechanism holding the tube and after a predetermined number of strokes are rotated to a position wherein the tube may be ejected on to the pin of a conveyor chain. The ejection is accomplished by the reciprocating rod which pushes the tube out from between the fingers.

The present invention contemplates the provision of a gripper adapted for use in the transfer mechanism referred to and elsewhere and which need not be mechanically operated but which is self contained and self adjusting to variations in the diameter of the work gripped, and which firmly engages the work automatically with sufficient force to permit the required withdrawal and transfer.

The invention further contemplates the provision of a simple but effective gripper operating by a frictional or clamping action regardless of whether the work is smooth, serrated or threaded, and made of a number of identical pivoted parts all held together by an annular spring.

The various objects of the invention will be clear from the description which follows and from the drawings, in which, Fig. 1 is a front elevation, partly in section, of my improved gripper as it appears when gripping a tube of one size, and showing in dotted lines the positions assumed by the parts when a larger tube is gripped.

Fig. 2 is a rear view of the same.

Fig. 3 is a side view of the same partly in section and showing a tube held by the gripper.

Fig. 4 is a longitudinal section of the same on an enlarged scale and taken on the line 4—4 of Fig. 3.

Fig. 5 is a vertical section of the same taken on the line 5—5 of Fig. 4.

Fig. 6 is a similar section taken on the line 6—6 of Fig. 4.

Since my improved gripper is usually brought into engagement with a tube by a longitudinal or axial movement such as that used in the transfer mechanism of said Patent 1,839,438 which is typical in that respect, it appears advisable to describe said mechanism briefly so that the utility, operation and functions of the gripper may be more readily understood.

Figure 8:
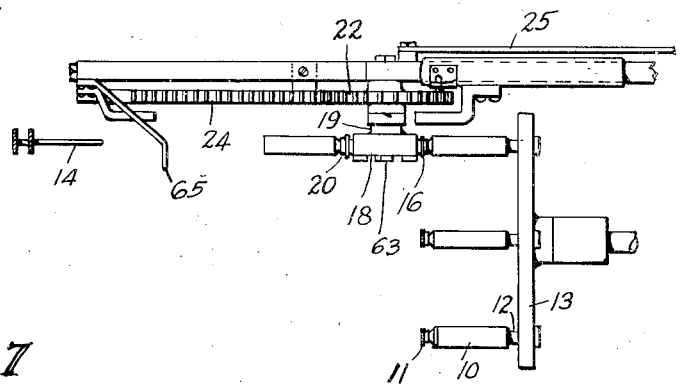
Fig. 8 is a top plan view of the same.
Figure 9:
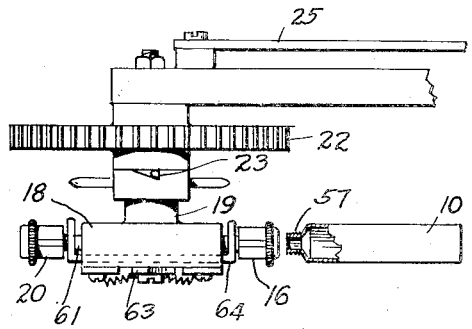
Fig. 9 is a similar fragmentary view of the same showing how the gripper may be used for engaging the threaded neck of a collapsible tube.

As disclosed in said patent, collapsible tubes as 10, (Figs. 7 and 8 herein) illustrated as capped at one end by the cap 11 and open at the other end, are assumed to have been coated while on the mandrels 12 of a coating machine as 13. The tubes are to be removed from the printing or enamelling machine 13 while wet and transferred to the pins 14 of the conveyor chain 15. Since the cylindrical surface of the tube is wet with enamel or printing ink and is so thin that it is easily crushed, the tube must be gripped at its capped end and withdrawn from the mandrel 12 and then deposited on the pin 14. The gripper 16 used for that purpose, is secured to the support 18 which is rotatably mounted on a shaft 19. An identical gripper 20 may be similarly fixed to the support 18 if desired in a diametrically opposite position. Means are provided to rotate the support on each of its strokes toward the mandrel and to prevent such rotation on each stroke away from the mandrel, the rotation being through an angle of 180°. Said means includes the gear wheel 22 fixed to the shaft 19 and operatively connected to the support 18 on each stroke toward the mandrel by the clutch 23. (Fig. 9).

The gear is moved bodily on to and off the fixed rack 24 by a suitable reciprocating link 25 which reciprocates the gear, support and grippers as a unit. Suitable means not necessary to describe in detail, align the gripper with the mandrel 12 and the pin 14 respectively at the ends of the respective strokes toward the right and left, as viewed in Figs. 7 and 8, respectively. By reason of the interposition of the clutch 23 between the shaft and the support, rotation of the gear in its stroke away from the mandrel does not cause rotation of the support nor of the gripper carried thereby, but during the return stroke from the pin 14 toward the mandrel, rotation of the gear is transmitted to the support 18 so that the grippers 16 and 20 are both rotated through an angle of 180° to interchange their relative positions.

If a tube 10 is in the grip of the gripper 20, such tube is removed therefrom at the end of its movement toward the left by means later to be described and deposited on the pin 14. On the return stroke of the gear toward the right and the consequent rotation of the support, the empty gripper 20 is aligned with the mandrel 12 in position to grip a tube which has been brought by the machine 13 into the proper position for that purpose. The gear leaves the rack 24 during the last part of the stroke toward the right, thereby permitting the parts to be properly aligned by the alignment means provided, whereby the final part of the stroke of the support causes engagement of the gripper with the tube. The operation being repeated, the tube is removed from the mandrel on the stroke toward the left and the tube on the gripper 16 is deposited on the pin 14.

Since the present invention is primarily directed to the construction of the gripper, the detailed description of the gripper may now be given with reference particularly to Figs. 1 to 6 and to the environment above described in which the gripper is used.

The member 30 is the frame or support on which a number of identical clamps as 31, 32, 33 and 34 are pivotally mounted. Four of such clamps have been shown, each approximately in the form of a quadrant, but it will be understood that more or less than four may be used as may be found convenient or desirable. The frame member 30 is fixed to the support of the transfer mechanism in any suitable manner as by means of the key 35 (Fig. 4), entering suitable slots in the reduced hub 36 of the frame 30 and in the support 18 respectively. Forwardly of the hub, the frame 30 is enlarged in diameter as at 41, where a series of circumferentially spaced apart and longitudinally arranged rectangular slots 37, 38, 39 and 40 are made in the frame for the reception of the respective extensions 42 of the gripping clamps. Said slots extend throughout the entire length of the cylindrical portion 41 to enable the clamps to project beyond the front end 43 of said portion when the extensions 42 are arranged on the frame and secured in place in the slots. A hinge pin as 44 passes through each extension and through the adjacent material of the portion 41 and serves as a pivot about which the clamp may swing to a limited extent in a manner later to be described when adjusting itself to the work. To provide access to the pin 44, a suitable recess as 45 is made in the material of the portion 41 between adjacent slots, there being a recess for each slot. (Figs. 3 and 6). Each recess is preferably triangular in cross section with the non-radial walls thereof perpendicular to each other so that the end of one pin and the non-corresponding end of an adjacent pin terminate at the respective walls to which the pins are perpendicular respectively. By reason of said recesses comparatively short pins may be employed without interference with each other.

The rear end portion of each of the extensions 42 is preferably rounded as at 46 to permit the clamp of which it forms a part, to swing about its pin and thereby automatically to adjust itself to the work which is gripped. The front end 47 of the clamp is also rounded to aid in the entrance movement of the work piece as 48 into the tubular space 49 between the front ends of the clamps. It will be noted that the projecting front end parts of the clamps 31—34 are in the form of annular segments and that their adjacent side edges 50 (Figs. 1 and 5) are radial and arranged quite closely to just clear each other. The inner peripheral surfaces of the clamps being of the same diameter, normally from a cylindrical clamping wall which is substantially unbroken and thereby are enabled to grip work of a variety of different shapes and sizes.

The limiting innermost position of each of the clamps is determined by the taper of the innermost wall 51 of the slot in which the extension 42 is inserted and swings, and by the opposite taper of the inner peripheral edge 52 of said extension. As shown in Fig. 4, contact between the wall 51 and the edge 52 prevents the clamp from moving any further inwardly. The point of contact may be arranged as desired by proper design of the tapers mentioned to permit the clamps to move inwardly until the space 49 is of the desired least diameter. The clamps are urged toward their innermost positions by the single coiled annular tension spring 53, in part set into the annular groove 54 made circumferentially in the outer surfaces of the clamps and in part projecting beyond said groove. The ends 55, 56 of the spring are suitably connected whereby the spring may be bent from a straight spring of the proper length into shape to hug the bottom of the groove.

Figure 10:
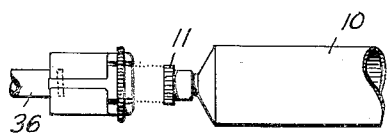
Fig. 10 is a fragmentary view of the gripper and of a capped collapsible tube which may be gripper preparatory to the transfer thereof.

In Figure 4, the work 48 is illustrated as a tube of substantially uniform diameter and having a closed end, but it will be understood, as by reference to Figs. 9 and 10 that an uncapped collapsible tube having an exposed threaded neck 57 may be gripped by the clamps without injury to the threads, or that the cap 11 of a capped tube may be gripped as desired. In other words, the gripper is adapted automatically to grip work differing greatly in shape and size. This results from the provision of the rounded front surfaces 47 on the clamps, which surfaces serve as cams acted upon by the work, to spread the clamps apart against the action of the spring 53. Said spring urges the clamps to swing toward each other about their respective hinge pins and into firm contact with the work inserted into the space 49, thereby to grip the work frictionally and with sufficient force and over a sufficient area to permit the work to be drawn off a mandrel as 12 when the gripper and the mechanism to which it is secured are moved away from the mandrel. For work of diameters larger than that shown, the clamps may assume the positions shown in dotted lines in Fig. 4. In any case, where the work is intended to consist of articles of the same theoretical size and shape, the clamps adjust themselves automatically to variations in size, alignment and concentricity, one or more of the clamps yielding under the pressure of the work.

Figure 7:
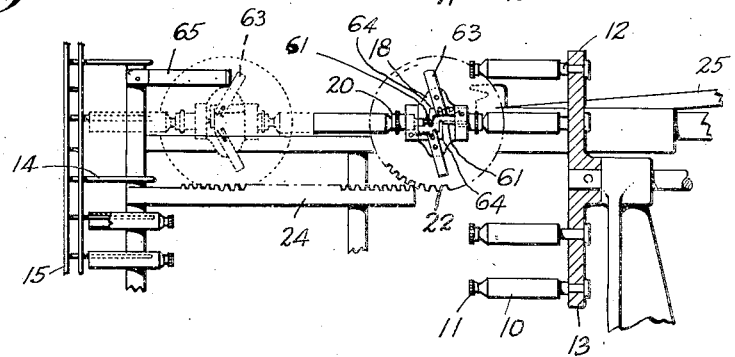
Fig. 7 is a front view of a tube transfer mechanism to which my invention has been applied showing in dotted lines the tube discharging position thereof.

For the purpose of ejecting the work from the gripper, a central longitudinal hole as 60 is made through the frame 30 in which hole is arranged the reciprocating ejecting rod 61. Said rod is operated at the proper time by any suitable mechanism to move it against the end wall as 62 of the work and to push the work out of the bight of the clamps. As shown in Figs. 7 and 9, the mechanism for reciprocating the rod 61 comprises a lever 63 pivoted to the support 18 and connected at one end as by the slide 64 to the ejecting rod. When the lever strikes a fixed stop as 65 it is swung in a clockwise direction into the position shown by the dotted lines of Fig. 7, thereby moving the slide 64 and the rod 61 toward the left to eject the work from the gripper 29 and on to a pin 14.

It will be seen that I have provided a work gripper which automatically adjusts itself to inaccuracies and variations in the work to be manipulated, which is of simple and efficient construction and capable of operating at a high speed since it dispenses with mechanism heretofore necessary to spread the clamps, and that I have provided a gripper well adapted to meet practical requirements.

While a specific form of the invention has been shown and described, certain changes may be made therein without departing from the spirit of the invention as set forth in the appended claims.

I claim:

1. In a gripper, a frame having a series of circumferentially spaced apart slots and a central opening therein for an ejecting rod, the innermost faces of the slots being in outward spaced relation to the opening, a series of rigid clamps each having an extension of rectangular cross section pivotally mounted adjacent one of the ends thereof in one of the slots and each having a part at the other end thereof projecting longitudinally beyond one end of the frame, said part having a continuous circumferential groove therein aligned with the corresponding groove of the adjacent parts each of said parts forming part of a hollow cylinder, and an annular spring set into the grooves and urging the clamps toward a common center, the bottom of each slot tapering upwardly toward one end of the frame and normally engaging the clamp mounted therein to limit the innermost position of the clamp and thereby to limit the least diameter of said hollow cylinder to a diameter greater than that of said central opening.

2. In a gripper, a frame having spaced slots therein, segmental annular article-gripping clamps arranged around a circle and each pivoted in one of the slots, an annular spring around the clamps the slots having tapered inner surfaces normally engaging the clamps and limiting the extent of the movement of the clamps inwardly, a rod slidable longitudinally in the frame and concentrically of the circle and of lesser diameter than the least diameter of the circle and means for reciprocating the rod.

3. In a gripper, a frame having spaced slots therein and having a central opening therethrough, segmental annular clamps arranged in a circle and each pivoted in one of the slots, an annular spring around the clamps a reciprocating ejecting rod in the opening of lesser diameter than the least diameter of the circle, and means on the frame determining said least diameter.

4. In a gripper, a frame having a cylindrical part and a reduced hub, said part having equally spaced longitudinal slots therein, the hub having a hole therethrough, an ejecting rod reciprocating in the hole and of sufficiently small diameter to remain at all times in inward spaced relation to the clamps hereinafter mentioned, clamps each having an extension inserted into one of the slots, a hinge pin for each clamp passing through the extension and the frame, an annular spring around the clamps urging said clamps toward a common center, and means for maintaining the clamps at all times out of contact with the rod.

5. In a gripper, a series of clamps in the form of annular segments surrounding a cylindrical work-receiving space, each of the segments having radial sides, a support on which the clamps are pivotally mounted to swing on separate axes in a common plane, means urging the clamps to move toward a common center, means on the support to limit the extent of the movement of the clamps toward said center, and means slidable axially in the support and of lesser diameter than the least diameter of said space to eject an article gripped by the clamps.

6. In a gripper, a plurality of pivotally mounted clamps each having a part in the form of an annular segment surrounding a portion of a cylindrical work-receiving space, an annular spring around the segments urging the segments toward the center of said space, means on the support to limit the extent of the movement of the clamps toward the center of said space, and means slidable axially in the support and of lesser diameter than the least diameter of said space to eject an article gripped by the clamps.

7. In a gripper self-adjusting under the pressure of an article of work inserted thereinto, a plurality of clamps each having a segmental annular peripheral inner clamping surface terminating in a convexly rounded end portion, each of the clamps having flat radial sides, means for pivotally supporting the clamps, yieldable means urging the clamps inwardly toward a position wherein the clamping surfaces form a substantially unbroken cylindrical wall, and an ejecting rod slidable axially in the supporting means and of sufficiently small diameter to remain out of contact with the clamps at all times, and means for reciprocating the rod.

CHARLES CROWLEY.